United States Patent [19]

Sanford et al.

[11] Patent Number: 4,758,695
[45] Date of Patent: Jul. 19, 1988

[54] AUTOMOTIVE TRANSMISSION CONTROL SYSTEM AND IMPROVED LONGEVITY THEREFOR

[75] Inventors: Carlton E. Sanford, E. Providence, R.I.; Leo Marcoux, Rehoboth; Douglas B. Strott, Attleboro, both of Mass.; George J. Lombardo, San Diego, Calif.

[73] Assignee: Texas Instruments Incorporated, Dallas, Tex.

[21] Appl. No.: 903,328

[22] Filed: Sep. 3, 1986

[51] Int. Cl.$^4$ .................................... H01H 35/34
[52] U.S. Cl. ........................ 200/83 P; 200/83 N; 200/302.1; 337/320; 92/103 M
[58] Field of Search ............... 200/81.4, 81.5, 83 R, 200/83 P, 83 Q, 83 J, 83 N, 302; 337/117, 318, 320, 321; 307/118; 340/626; 92/5 R, 103 M; 73/717, 723, 861.47

[56] References Cited

U.S. PATENT DOCUMENTS

| | | | |
|---|---|---|---|
| 4,211,901 | 7/1980 | Matsuda | 200/83 N |
| 4,220,836 | 9/1980 | Hersey | 92/103 M |
| 4,386,247 | 5/1983 | Couat | 200/83 N |
| 4,521,651 | 6/1985 | Matsumoto | 200/83 N |
| 4,591,677 | 5/1986 | Hirota | 200/83 J |

Primary Examiner—G. P. Tolin
Attorney, Agent, or Firm—John A. Haug; James P. McAndrews; Melvin Sharp

[57] ABSTRACT

An automotive transmission control is shown having pressure switches to sense the state of actuation of solenoid valves to provide logic signals to a microprocessor type of transmission control. The pressure switches, which sense the pressure of hydraulic fluid used to actuate the solenoid valves, use a dished shaped metallic diaphragm characterized in that the pressure-deflection curve of the center of the diaphragm has minimal hysteresis and reflects that the diaphragm is relatively stiff having a positive coefficient of pressure with increasing deflection up to and above a range of set point pressures within which the effective spring rate of the diaphragm changes with the diaphragm being relatively supple but having little or no negative coefficient of pressure.

In a first embodiment a housing is shown in which a conductive lead pattern is molded in the housing with a plurality of switching stations. Each switching station has a circular diaphragm formed with an annular flat berm portion which lies on a portion of the conductive lead pattern and is sealed by an "O" ring biased against the berm by a sleeve which interfaces with the hydraulic fluid. An electrically conductive rivet is placed beneath the diaphragm within a specific distance from a plane on which the berm lies so that a circuit will be closed upon sufficient deflection of the diaphragm. The housing mounts electrical contacts for energizing the solenoid valves and a pin connector coupled to the conductive lead pattern.

Other embodiments are shown using diaphragms having the same pressure-deflection curve.

11 Claims, 6 Drawing Sheets

AUTOMOTIVE TRANSMISSION CONTROL SYSTEM AND IMPROVED LONGEVITY THEREFOR

In the automotive industry it has become common to control various functions such as air-fuel mixtures by means of a microprocessor based engine control module (ECM) to obtain significant improvements in performance, fuel economy and emissions. Recently attempts have been made to improve the operation and efficiency of transmission systems by integrating engine and transmission control. This requires that the transmission be compatible with the ECM and be electronically accessible with inputs and outputs. One approach in which solenoid valves are employed to effect gear shifting uses pressure switches in the solenoid valve assembly as a way to confirm that solenoid valve actuation and deactuation has occurred. That is, there is a noticeable change in the pressure of the hydraulic fluid in the output of a solenoid valve upon actuation, typically in the order of 165 psig. This change in pressure can be easily sensed using conventional snap acting pressure responsive switches which can close or open electrical circuits on the occurrence of selected pressure levels. Such switches can be readily adapted to meet varying packaging requirements regarding size and cost. However when used for transmission control, a life expectancy in the order of 25 million cycles or more is required whereas conventional snap acting pressure switches have a life expectancy significantly lower than that, in the order of a million cycles at best.

Briefly, in accordance with the invention a metallic diaphragm is formed with a central dished portion having on one major face a convex surface configuration such that the center of the portion has a pressure deflection curve with the diaphragm being relatively stiff and having a positive coefficient of pressure with increasing deflection up to and above a relatively narrow range of set points or calibrated pressures. Within this narrow range of pressures the effective spring rate of the diaphragm changes with the diaphragm being relatively supple with the center of the portion moving from a point $d_1$ to a point $d_2$ with little or no negative coefficient of pressure. A switch component in the form of an electrical contact or a motion transfer member is positioned so that it is disposed between points $d_2-d_1$ as will be explained in greater detail infra. With decreasing pressures the diaphragm moves from point $d_2$ to point $d_1$ with minimal hysteresis.

In one embodiment comprising a housing having several switches the diaphragm is formed with an annular flat berm portion which is received on an electrical contact member with an "O" ring disposed on top of the berm and biased thereagainst to form a fluid pressure seal by a tubular sleeve which communicates with an hydraulic fluid pressure source. In a modified embodiment the tubular sleeve is provided in two segments with the "O" ring sandwiched therebetween so that the sleeve itself engages the berm portion. An electrical contact rivet is placed beneath the central dished portion and connected to a suitable electrical connector. According to a feature of the invention a current limiting resistor of a selected value can be placed in series with each switch to obtain a voltage signal output upon actuation of each respective switch.

In another embodiment the entire diaphragm is dished and is received on a diaphragm seat and maintained at the seat by means of a thin, flexible membrane which also provides a seal for the switch.

In still another embodiment a motion transfer element is placed beneath the dished portion so that motion of the diaphragm is transferred to a movable contact arm to open and close a pair of electrical contacts.

It is therefor an object of the invention to provide a switch with an extremely long life expectancy. Another object is the provision of a switch which is economical to produce both in material and assembly. Another object is to provide a switch which needs no calibration as an assembly, the calibration of the switch being inherently controlled by the characteristics of the diaphragm and the dimensional positioning of the stationary contact. Yet another object is the provision of a pressure responsive switch having a life expectancy in excess of 25 million cycles, an operating temperature range of −40° to 300° F. and a cycling response capability of up to 50 Hz. Another object of the invention is the provision of a switch mechanism with minimal set point differential or hysteresis and one which can be made to actuate at a given level of pressure within plus or minus 5 psi.

Other objects, features and advantages of the invention will be apparent from the following detailed disclosure, taken in conjunction with the accompanying drawings, wherein like reference numerals refer to like parts.

Figure 1:
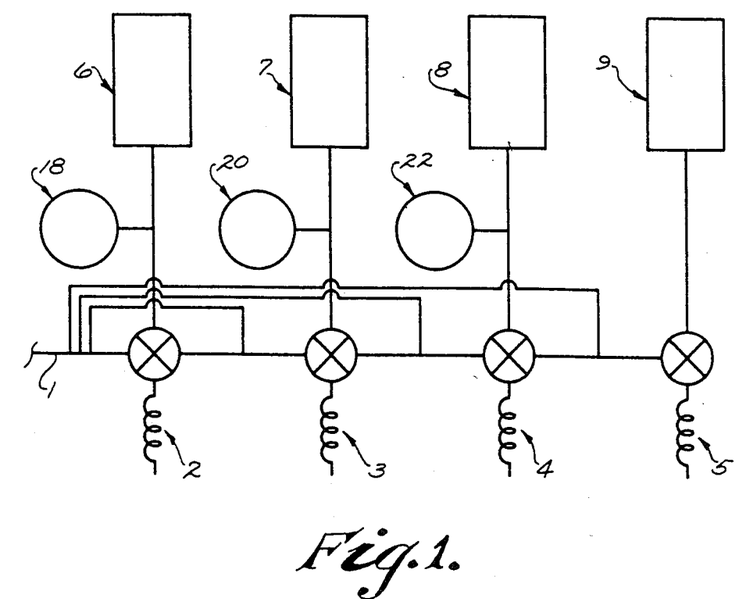
FIG. 1 is a schematic representation of a transmission control assembly in which pressure switches made in accordance with the invention are used.

Referring to FIG. 1 of the drawings in which a proposed transmission control assembly is shown numeral 1 indicates an hydraulic fluid pressure source connected to solenoid actuated valves 2, 3, 4 and 5 to control respectively friction elements 6, 7, 8 and 9. Pressure sensing switches 18, 20 and 22 are placed in communication with the output line of respective solenoid actuated valves 2, 3 and 4. The valves may be normally vented and/or normally pressurized with the state of actuation sensed by the pressure switches. For example, when a valve is actuated placing its output line in communication with the hydraulic fluid pressure source 1, the pressure at the pressure sensor ramps up from approximately 0 psig to 165 psig. This change in pressure, as will be described infra, is converted to an electrical signal which can be inputted to the microprocessor to confirm that actuation or deactuation of a respective valve has taken place.

Figure 2:
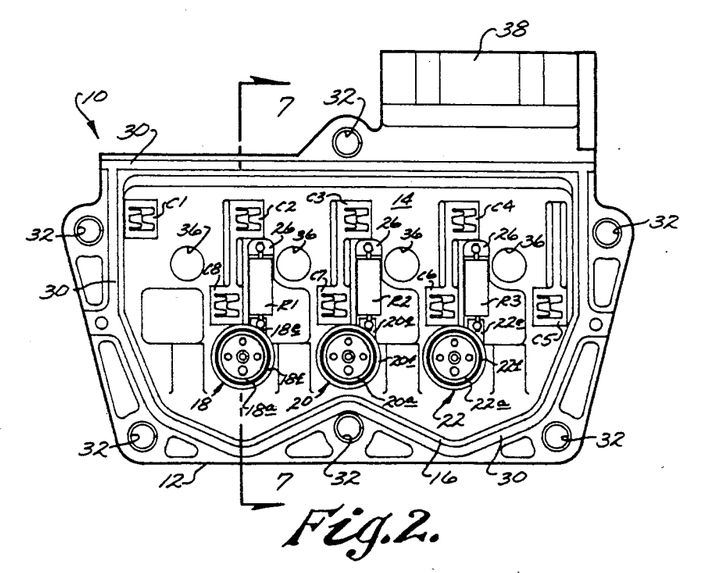
FIG. 2 is a front elevational view of pressure switch assembly made in accordance with the invention showing three switch stations but, for purposes of illustration having the pressure sensing diaphragms removed.
Figure 3:
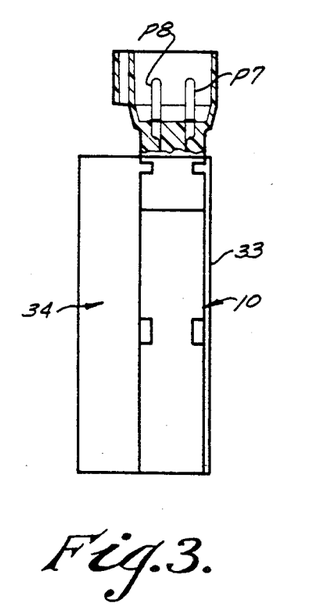
FIG. 3 is a side elevational view of the FIG. 2 assembly with a connector portion shown in cross section and shown attached to a solenoid assembly and with a back plate attached.
Figure 4:
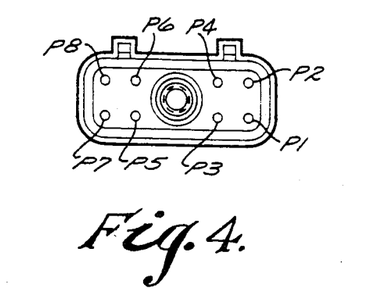
FIG. 4 is a top plan view of the connector portion of the switch assembly.
Figure 5:
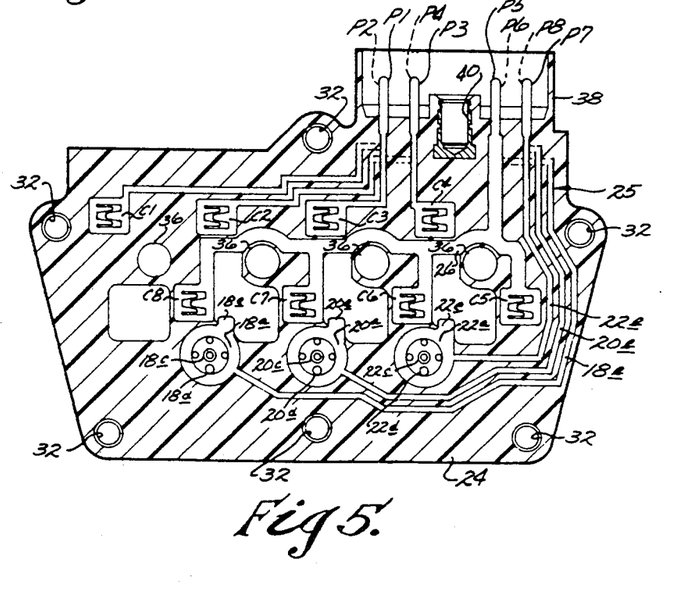
FIG. 5 is a cross sectional view taken on line 5—5 of FIG. 7 showing a pattern of electrically conductive paths molded into the assembly housing.

With particular reference to FIGS. 2-8, Numeral 10 generally designates a switch assembly comprising a housing 12 of suitable electrically insulative material such as a moldable glass filled thermoplastic material having a back wall 14 and a side wall 16 depending therefrom defining a shallow recess in which are disposed three pressure switch stations 18, 20 and 22. Housing 12 is preferably formed with the desired electrical conductors molded therein. As seen in FIG. 5, the plane 24 formed by the cross section shows conductive paths 25 disposed thereon in a selected pattern. The pattern is conveniently stamped from a suitable metal sheet such as brass with portions of the pattern blanked out after the molding operation through apertures (not shown) formed in back wall 14 for the purpose of isolating respective circuits. It will be understood that the housing could also be made of two plate like members with the conductive paths 25 sandwiched therebetween or the paths could be coated onto one of the plate members, if desired. The paths include annular portions 18a, 20a and 22a located at the switch stations including respective platform portions 18e, 20e, and 22e the purpose of which will be described infra, with traces 18b, 20b and 22b extending from respective annular portions to respective pins P6, P8 and P7. Pins P2, P4, P6 and P8 are not shown in FIG. 5 but are indicated by dashed lead lines since they are located in the front half of the housing. FIG. 4 shows the layout of pins P1-P8. Pin P5 is connected to a conductive trace 26 which extends to a plurality of spring connectors C5-C8. Pin P3 extends to spring connector C4, pin P4 extends to connector C2, pin P1 extends to spring connector C3 and finally pin P2 extends to spring connector C1.

Within the space defined by each annular conductive layer 18a, 20a and 22a are a center contact bore 18c, 20c and 22c respectively and a plurality of vent holes 18d, 20d and 22d which will be described in greater detail infra with respect to FIG. 8.

Referring back to FIG. 2, back wall 14 is formed with cut away portions to expose contact springs C1-C8, annular conductive portions 18a, 20a and 22a as well as platform portions 18e, 20e and 22e and portions of trace 26 opposed to each platform. Selected resistors R1, R2, and R3 are welded between respective platform portions 18e, 20e, 22e and opposed portions of trace 26.

Back wall 14 is formed with a cylindrical wall 18f, 20f and 22f for each respective switch station aligned with respective annular conductors 18a, 20a, 22a to form switching cavities. Side wall 16 is formed with a packing groove 30 around the periphery of the housing and a plurality of bolt holes 32 to attach a back plate 33 (FIG. 3) and to secure the housing to a solenoid valve assembly 34 (FIG. 3). Bores 36 extend through back wall 14 to conserve material and provide venting to a sump. A shroud 38 extends around the pins P1-P8 to isolate them from the environment. A threaded bore 40 is formed in housing 12 within the shroud 38 to secure a female connector (not shown).

Figure 6:
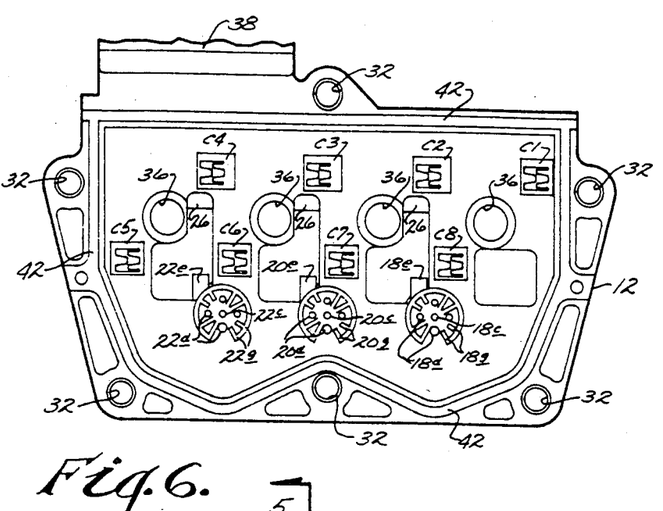
FIG. 6 is a rear elevational view of the switch assembly housing.
Figure 7:
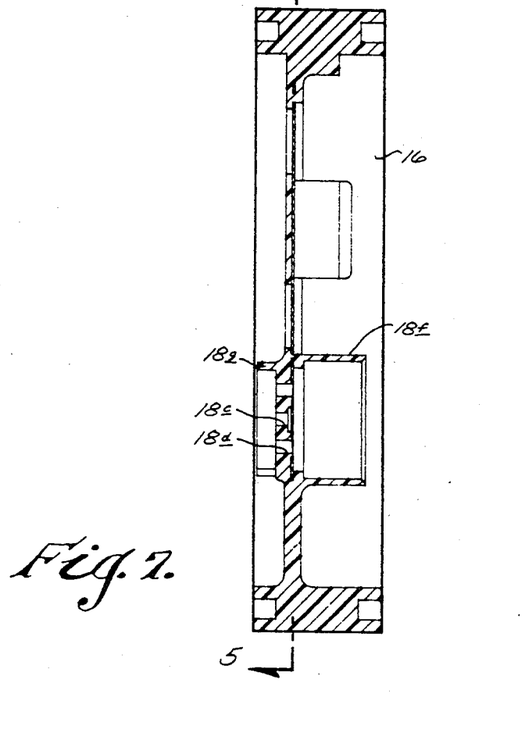
FIG. 7 is an enlarged cross sectional view taken of line 7—7 of FIG. 2.

FIG. 6 shows the rear view of housing 12 with a portion of shroud 38 removed for convenience and shown without resistors R1-R3. A packing groove 42 is formed around the perimeter of platform 24 similar to that of groove 30 shown in FIG. 2. Each switch station is provided with strengthening ribs 18g, 20g, 22g.

Figure 8:
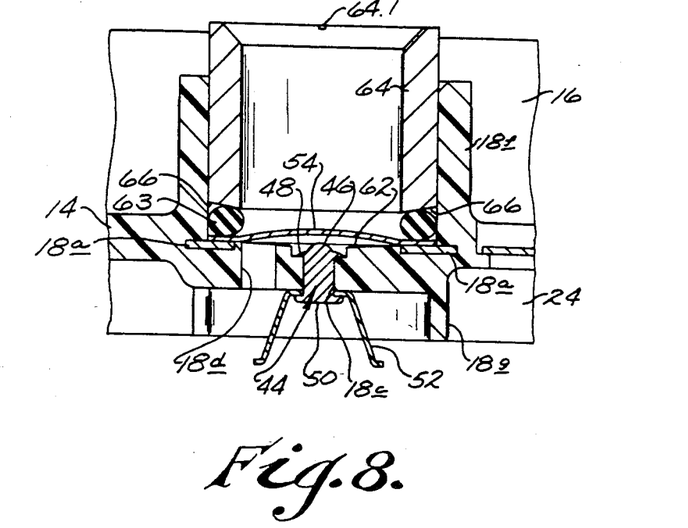
FIG. 8 is an enlarged cross sectional view taken through a switching station shown with the diaphragm sealed in place through an "O" ring.
Figure 9:
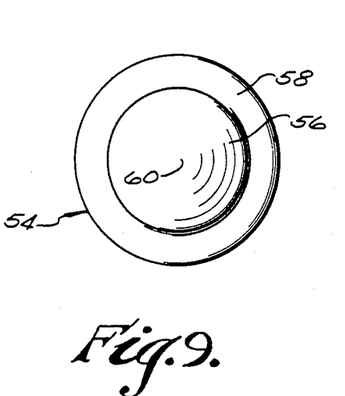
FIG. 9 is an enlarged plan view of a diaphragm made in accordance with the invention.
Figure 10:
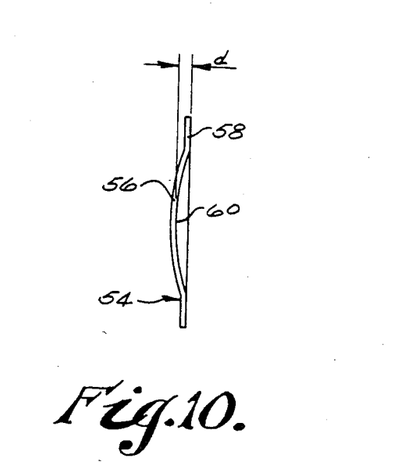
FIG. 10 is an enlarged side elevational view of the FIG. 9 diaphragm.

With particular reference to FIGS. 8-10 one of the switch stations will be described. An electrically conductive rivet 44 is received in bore 18c and has one end 46 disposed along the longitudinal axis of the rivet a selected distance from a plane lying on the top surface (as seen in FIG. 8) of annular conductor 18a and serves as a center contact for the switch. This can be fixed by a shoulder 48 abutting the back wall contiguous to the bore 18c. The other end 50 of rivet 44 is headed over to capture a spring contact 52 formed of good electrically conductive material having good spring characteristics such as berrylium copper. Contact 52 is generally U-shaped with the bight captured by rivet 44 and the free distal ends of its two legs extending beyond housing 12 to make electrical connection with a grounded metal plate 33 (FIG. 3) attached to housing 12. Alternatively, the rivets of the several switches can, if desired, be connected to a grounded common bus. Further, if desired, the center contact could be molded in housing 12 along with the other conductive paths 25.

A generally circular diaphragm 54 formed of electrically conductive metal having good spring characteristics such as stainless steel is formed with a diameter slightly less than the inside diameter of wall 18f so that it can be received therein. The central portion 56 of diaphragm 54 is deformed beyond its elastic limit with the center of the diaphragm displaced an amount "d" shown in FIG. 10 so that it has a slight dished configuration leaving a flat annular berm 58 around its periphery. Diaphragm 54 is placed within cylindrical wall 18f with berm 58 resting on annular conductor 18a and with the convex surface configuration of the dished diaphragm facing away from rivet 44. An "O" ring 63 having an outside diameter approximately the same as the inside diameter of wall 18f and an inside diameter somewhat greater than the inside diameter of berm 58 to minimize effects of "O" ring compression on diaphragm 54 is placed on top of the berm and a cylindrical sleeve 64 of brass or other suitable material is telescopically and slidably received in cylindrical wall 18f having inside and outside diameters similar to that of "O" ring 63 so that it can place a sealing force on the "O" ring to prevent more than a specified amount of fluid received in the sleeve 64 from going beyond diaphragm 54. In this particular application a certain amount of leakage is desired in order to continuously purge the system of air. For this purpose sleeves 64 are notched or vented at 64.1 at their outer end to allow for this controlled leak, in the order of 100 grams of working fluid per minute. The end surface 66 of sleeve 64 which contacts the "O" ring is preferably outwardly tapered so that the force transferred to the "O" ring will be radially outward against wall 18f as well as against the "O" ring and berm to optimize the sealing effect and minimize compression effects on the calibration of diaphragm 54 as noted supra. As noted in FIG. 8, the sleeve extends beyond wall 16 a slight amount. When the solenoid module is attached to housing 12 as indicated in FIG. 3, a force will be placed against the sleeve to bias it firmly toward the "O" ring. With the solenoid module attached to housing 12 sleeve 64 of switching station 18 is placed in communication with a pressure source used to actuate the transmission solenoid valves. Switching stations 20 and 22 are similarly coupled to other transmission solenoid valves.

Figure 11:
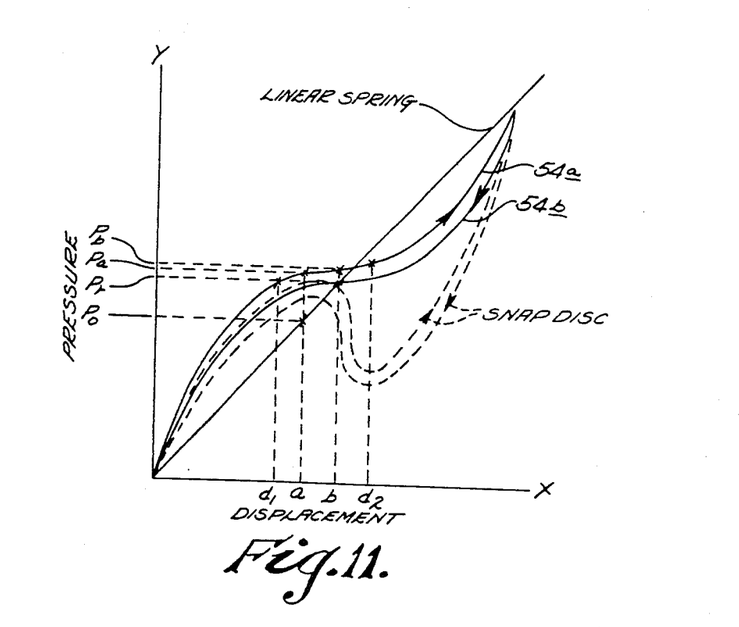
FIG. 11 is a pressure versus displacement graph of a diaphragm made in accordance with the invention as well as a conventional snap acting disc and a linear pressure responsive member.

Forming of the diaphragm 54 with a dished configuration results in a nonlinear pressure or force versus diaphragm center point displacement. For example such nonlinear relationships are produced when forming a snap acting disc. Such discs display a pressure versus displacement curve which is characterized by being relatively stiff with relatively little displacement with increasing pressure from zero pressure up to a critical pressure level at which the center of the disc, with no added pressure, rapidly goes through a plane in which the outer periphery of the disc lies. See the curve labeled "snap disc" in FIG. 11 where the snap action is indicated by the negative slope with increasing deflection. It will be noted that for the disc to snap back to its original configuration a lower pressure must be reached than that at which the disc originally snapped. The difference between actuation pressure (moving in one direction) and deactuation pressure (moving in the opposite direction (is known as differential or hysteresis and as seen in FIG. 11, the differential of diaphragm 54 is relatively narrow compared to that of the snap acting disc. Snap action involves the building up of stresses until this rapid release of energy occurs and these stresses result in limiting the useful life of the disc which make such discs unsuitable for applications calling for minimum life expectancy in the millions of cycles.

It has been found that if the disc is formed with less of a bulge the negative portion of the slope can be minimized and even eliminated with a concomitant reduction in stresses so that the life expectancy of the disc is greatly increased. As noted in FIG. 11, the curve labeled 54a and 54b, the diaphragm is relatively stiff with a positive coefficient of pressure with increasing deflection up to and above a narrow set point of calibrated range between $d_1$ and $d_2$ where the effective spring rate of the diaphragm changes with the diaphragm becoming relatively supple characterized in that the center point of the diaphragm experiences considerable travel with only a small increase in pressure but without any negative slope. That is, a positive force or pressure is always required to keep the center of the diaphragm moving in the direction of the arrows shown on curve 54a. As noted by curve 54b, there is only a slight hysteresis with slightly lower pressure relating to displacement with the center of the diaphragm moving in the opposite direction.

One of the advantages that using such a diaphragm offers is that the placement of contact surface 46 is much less critical to obtain consistent operation. For example, if contact 46 were placed at point "a" shown on the abscissa this would correspond to contact closure (center 60 of 10 diaphragm 54 engaging point 46) at $P_a$ pressure however if the contact surface were displaced, for example due to dimensional tolerances in parts and assembly or even wear, to point "b" contact closure would occur at $P_b$ pressure which, as seen in FIG. 11 is nearly the same pressure. In contradistinction, if one were to use a conventional linear spring denoted by the line labeled "linear spring" the displacement of the contact surface from "a" at pressure $P_o$ to "b" would result in contact closure at pressure $P_r$ which is significantly higher than the pressure at point "a" and would cause a calibration problem in many applications. Thus due to the minimal change in pressure in the set point range, a switch made in accordance with the invention needs no calibration for many applications other than the proper placement of the stationary contact.

In making a switching device in accordance with the invention the contact surface 46 should be placed on the longitudinal axis of rivet 44 which intersects center 60 of disc 54 within deflection locations $d_1$ and $d_2$ relative to a plane on which berm 58 lies to take advantage of minor variations in placement of the contact surface, thermal effects or even wear of the contact surface with minimal affects on actuation pressure levels. Surface 62 of the wall beneath the diaphragm (as seen in FIG. 8) is contoured slightly downwardly in a direction going toward rivet 44 permitting placement of contact surface 46 below the plane on which berm 58 lies if desired while still preventing excessive diaphragm overtravel. In order to obtain maximum benefit for effective contact closure as the contact wears the contact should initially be placed on the $d_1$ side of the range.

Diaphragms made for a switching assembly made in accordance with this invention were formed of a sheet of stainless steel 0.0040 inch thick with an outer diameter for berm 58 of 0.500 inch and a diameter of 0.350 inch for the center portion. The diaphragm was formed so that center portion 60 displacement "d" was 0.008 inch. This resulted in a deflection of $d_2-d_1$ of 0.004 inch which corresponded to pressures of 18 and 23 psig respectively.

Different values of set point pressures (those pressures corresponding to $d_1$ and $d_2$) can be obtained by using a different thickness for the diaphragm 54, different heat treatment, by using different material or by modifying the form of the die sets used in shaping the center portion.

In order to ensure that the "O" ring compression does not effect the calibration of the diaphragm a stop can be provided in side wall 18f to limit the downward travel of sleeve 64, and concomitantly the compression of the "O" ring.

Figure 8A:
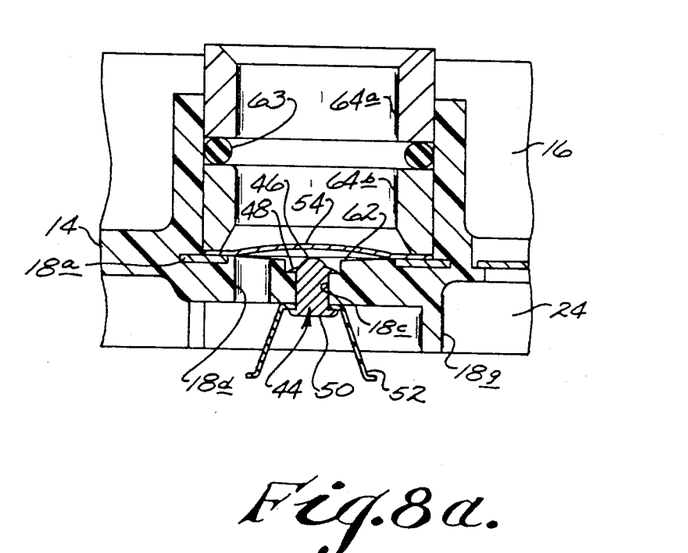
FIG. 8a similar to FIG. 8 and shows a modification in which the "O" ring is sandwiched between segments of a tubular member.

Alternatively, since some leakage of fluid is permissable the sleeve can be provided in two segments 64a and 64b with "O" ring 63 sandwiched therebetween as seen in FIG. 8a. Sleeve segment 64b avoids any lateral forces from being transmitted to the diaphragm while "O" ring 63 electrically isolates segment 64a from the diaphragm.

Figure 12:
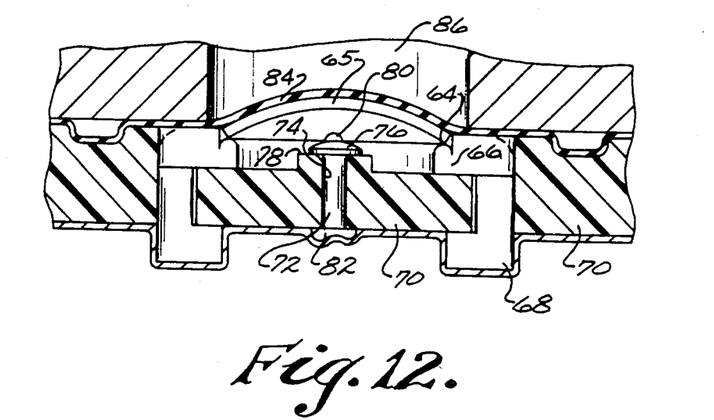
FIGS. 12 and 13 are cross sectional views of a switching station of two other embodiments of the invention.

FIG. 12 shows an embodiment similar to that of FIGS. 2-10 but has a diaphragm 62 in which the entire surface area of the major face is dished, i.e., it has no flat berm area corresponding to berm 58 of diaphragm 54. However, diaphragm 65 has the same pressure-deflection curve as that of diaphragm 54 shown in FIG. 11. Diaphragm 65 is disposed on a recessed annular seat 64 formed in an electrically conductive ring 66. A first terminal 68 extends below an electrically insulative wall 70 to permit attachment to a suitable circuit. An electrically conductive rivet 72 is disposed in a bore 74 in wall 70 aligned with the center of annular seat 64. Rivet 72 has a head 76 which abuts surface 78 to properly locate contact surface protrusion 80 at a selected distance along the longitudinal axis of the rivet from a plane in which the outer periphery of the diaphragm lies. The rivet is headed over at 82 which serves as a second terminal to complete a circuit with terminal 68. A flexible membrane 84 is received over the diaphragm to maintain the diaphragm at its recessed seat as well as to transfer pressure to the diaphragm.

Figure 13:
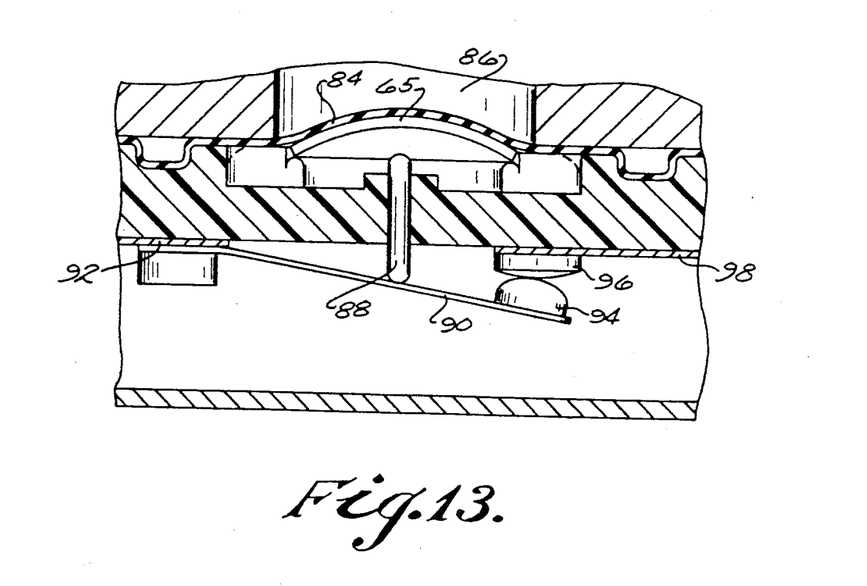

FIG. 13 shows an embodiment using a diaphragm formed in the same manner as diaphragms 54 and 65 but in this embodiment the diaphragm does not carry electric current but instead transfers its motion through a transfer motion pin 88 to a movable contact arm 90. Movable contact arm 90 is cantilever mounted at one end and electrically connected to terminal means 92 and has a movable contact 94 mounted on its distal free end adapted to move into and out of engagement with a stationary contact 96 electrically connected to terminal means 98. Thus when the pressure source 86 increases sufficiently to cause the center of diaphragm 65 to move, its motion, after contacting pin 88, will be transferred to movable arm 90 causing movable contact 94 to move out of engagement with stationary contact 96.

Although diaphragms formed such that there is no negative coefficient of pressure with increasing deflection between the set points are preferred since this results in the greatest improvement in longevity, diaphragms formed with only a slightly negative coefficient can be used in certain applications if the differential is sufficiently narrow in order to minimize stresses to which the diaphragm is subject. For example it has been found that such diaphragms which have a differential of 20% or less of actuation pressure but preferably 5% or less have been found to exceed 25 million cycles. Thus for a diaphragm adapted to actuate at a pressure of approximatley 20 psi a differential of 4 psi and preferably 1 psi can provide adequate longevity for many applications even if there is a slightly negative slope to the deflection curve.

It will be recognized that various modifications of the embodiments disclosed are possible within the scope of the invention claimed. For example diaphragms made in accordance with the invention can be used to sense force as well as pressure and can be composed of bimetal to sense temperature changes if so desired.

What is claimed is:

1. A pressure responsive switch assembly comprising an electrically insulative base member, a generally cylindrical wall member extending from the base member defining a switch chamber, an electrical contact member disposed on the base member within and closely adjacent to the wall member, a dished shaped circular metallic diaphragm having a convex surface configuration on a face thereof and a flat annular berm portion received in the switch chamber with the berm portion engaging the electrical contact member and with the convex surface facing away from the base member, an "O" ring aligned with and received over the top of the annular berm portion, a sleeve having an outer diameter such that it is slidably receivable within the cylindrical wall member disposed in the switch chamber in engagement with the "O" ring and adapted to place a bias on the "O" ring to maintain the diaphragm in position and to form a seal, the sleeve having an end engageable with the "O" ring and that end being tapered to form a cam surface placing a force on the "O" ring in a direction which is radially outwardly as well as toward the base member when the sleeve is biased toward the base member to enhance the efficacy of the seal, the sleeve being connectable to a pressure source, and an electrically conductive center contact member mounted on the base member in alignment with the center of the diaphragm whereby upon the occurrence of sufficient pressure on the face of the diaphragm having the convex configuration the center of the diaphragm will move into electrical engagement with the center contact member.

2. A pressure responsive switch assembly according to claim 1 in which the center contact comprises a rivet received in a bore in the base member which extends from the switch chamber to an opposite side and a spring contact member is fastened to the rivet on the opposite side of the base member.

3. A pressure responsive switch assembly according to claim 1 in which a bore is formed in the base member and extends from the switch chamber beneath the diaphragm to an opposite side which serves as a venting means.

4. A pressure responsive switch assembly according to claim 1 further including a resistor serially connected to the electrical contact member in engagement with the berm of the diaphragm so that a set voltage signal is generated upon actuation of the switch.

5. A pressure responsive switch assembly according to claim 1 in which the electrical contact member in engagement with the annular berm of the diaphragm has an annular shaped portion in alignment with the berm of the diaphragm.

6. Switch apparatus according to claim 1 in which the further comprising an electrically insulative membrane received over the diaphragm.

7. Switch apparatus according to claim 1 in which the center contact comprises a rivet received in a bore in the base member which extends from a switch chamber to an opposite side, a spring contact member is fastened to the rivet on the opposite side of the base member and an electrically conductive plate member is received over the opposite side of the base member in engagement with each spring contact member.

8. An electric switch according to claim 1 in which the diaphragm is approximately 0.0040 inch thick, the central dished portion has a diameter of approximately 0.350 inch, the central dished portion is formed so that the center is displaced approximately 0.008 inch and $d_2 - d_1$ is approximately 0.004 inch.

9. A pressure responsive switch assembly according to claim 1 in which the sleeve has an opposite end formed with notch means to provide a controlled leakage path.

10. An electric switch having a base member, a generally cylindrical wall member extending from the base member defining a switch chamber, an electrical contact member disposed on the base member within and closely adjacent to the wall member, a dish shaped circular metallic diaphragm having a convex surface configuration on a face thereof and a flat annular berm portion engaging the electric contact member and with the convex surface facing away from the base member, sealing means including a sleeve having an outer diameter such that it is slidably receivable within the cylindrical wall member disposed in the switch chamber to maintain the diaphragm in position, the sleeve being formed of first and second cylindrical segments and an "O" ring is sandwiched between the segments, the sleeve being connectable to a pressure source, and an electrically conductive center contact member mounted on the base member in alignment with the center of the diaphragm whereby upon the occurrence of sufficient pressure on the face of the diaphragm having the convex configuration the center of the diaphragm will move into electrical engagement with the center contact member.

11. An electric switch having a base member, a generally cylindrical wall member extending from the base member defining a switch chamber, an electrical contact member disposed on the base member within and closely adjacent to the wall member, a dish shaped circular metallic diaphragm having a convex surface configuration on a face thereof engaging the electric contact member and with the convex surface facing away from the base member, a sleeve having an outer diameter such that it is slidably receivable within the cylindrical wall member disposed in the switch chamber, the sleeve being formed of first and second cylindrical segments and an "O" ring is sandwiched between the segments, the sleeve being connectable to a pressure source, and an electrically conductive center contact member mounted on the base member in alignment with the center of the diaphragm whereby upon the occurrence of sufficient pressure on the face of the diaphragm having the convex configuration the center of the diaphragm will move into electrical engagement with the center contact member.

* * * * *